(12) United States Patent
Pellette et al.

(10) Patent No.: US 9,592,467 B2
(45) Date of Patent: Mar. 14, 2017

(54) SYSTEM AND METHOD FOR REDUCING FOULING RATE IN A HYDROGENATION REACTOR

(71) Applicant: ExxonMobil Chemical Patents Inc., Baytown, TX (US)

(72) Inventors: Jerome Pellette, Baton Rouge, LA (US); Kirk C. Nadler, Houston, TX (US); Jeffrey M. Sharp, II, Tokyo (JP)

(73) Assignee: ExxonMobil Chemical Patents Inc., Baytown, TX (US)

(*) Notice: Subject to any disclaimer, the term of this patent is extended or adjusted under 35 U.S.C. 154(b) by 375 days.

(21) Appl. No.: 14/228,924

(22) Filed: Mar. 28, 2014

(65) Prior Publication Data

US 2014/0343335 A1  Nov. 20, 2014

Related U.S. Application Data

(60) Provisional application No. 61/823,146, filed on May 14, 2013.

(51) Int. Cl.
*B01D 21/00* (2006.01)
*B01D 49/00* (2006.01)
(Continued)

(52) U.S. Cl.
CPC ......... *B01D 49/00* (2013.01); *B01D 21/0009* (2013.01); *B03C 1/035* (2013.01);
(Continued)

(58) Field of Classification Search
CPC .... B01D 21/00; B01D 21/0009; B01D 49/00; B03C 1/00; B03C 1/02; B03C 1/025;
(Continued)

(56) References Cited

U.S. PATENT DOCUMENTS

| 4,328,090 A | 5/1982 | Stuckey, Jr. et al. |
| 4,629,766 A | 12/1986 | Malatesta et al. |

(Continued)

FOREIGN PATENT DOCUMENTS

| EP | 0082726 | 12/1981 |
| EP | 0240253 | 10/1987 |

(Continued)

OTHER PUBLICATIONS

Bilfinger Article. http://www.water.bilfinger.com/fileadmin/water-technologies/applications/application-brochures/Internals_for_Down_Flow_Reactors.pdf.

*Primary Examiner* — Natasha Young
(74) *Attorney, Agent, or Firm* — Nancy T. Krawczyk (57) ABSTRACT

Fouling rate inhibition for a hydrogenation reactor. A hydrocarbon hydrogenation method comprises passing a liquid feedstream through a magnetic field to separate magnetically susceptible particles, and introducing the magnetically lean stream into a fixed catalyst bed under hydrogenation conditions to saturate carbon-carbon double bonds in the hydrocarbon. Also, a hydrogenation reactor system comprises a magnetic conditioning zone, an inlet flow path to introduce a magnetically lean stream from the magnetic conditioning zone into a fixed catalyst bed and an outlet flow path from an outlet end of the catalyst bed to withdraw reactor effluent.

22 Claims, 6 Drawing Sheets

(51) Int. Cl.
*B03C 1/00* (2006.01)
*B03C 1/02* (2006.01)
*B03C 1/025* (2006.01)
*B03C 1/031* (2006.01)
*B03C 1/033* (2006.01)
*B03C 1/28* (2006.01)
*C09F 1/00* (2006.01)
*B03C 1/035* (2006.01)
*C08F 8/04* (2006.01)

(52) U.S. Cl.
CPC ............... B03C 1/286 (2013.01); C08F 8/04 (2013.01); *B03C 2201/18* (2013.01)

(58) Field of Classification Search
CPC ......... B03C 1/031; B03C 1/033; B03C 1/035; B03C 1/28; B03C 1/286; C09F 1/00
See application file for complete search history.

(56) References Cited

U.S. PATENT DOCUMENTS

| | | | | |
|---|---|---|---|---|
| 4,836,914 | A | * | 6/1989 | Inoue .................... C10G 67/02 208/177 |
| 5,171,793 | A | | 12/1992 | Johnson et al. |
| 5,543,041 | A | * | 8/1996 | Okazaki ................ C10G 67/02 196/46.1 |
| 6,755,963 | B2 | | 6/2004 | Haluska et al. |
| 2007/0056882 | A1 | * | 3/2007 | Maunder ............... B07C 5/3425 209/233 |

FOREIGN PATENT DOCUMENTS

| | | |
|---|---|---|
| WO | 9512623 | 5/1995 |
| WO | 9903578 | 1/1999 |

\* cited by examiner

SYSTEM AND METHOD FOR REDUCING FOULING RATE IN A HYDROGENATION REACTOR

PRIORITY CLAIM

This application claims priority to and the benefit of U.S. Provisional Application No. 61/823,146, filed May 14, 2013.

BACKGROUND

The present invention relates to the hydrogenation of hydrocarbons and also to the improvement of the life of the catalyst used in the hydrogenation reactor systems and methods.

Fixed-bed catalyst reactors are used to hydrogenate unsaturated hydrocarbons, such as hydrocarbon resins, e.g., for the purpose of removing sulfur, odor, and color from tackifying resins. It is common for such reactors to foul in the initial volume of catalyst. Because various impurities enter the reactor, e.g., coke particles, metal flakes, polymer solids, such particles can fill the void fraction in the catalyst bed. Typically, the voids in the top few feet of the bed can readily fill, forming a consolidated crust of catalyst particles, and over time the pressure drop across this fouled zone becomes prohibitively high.

In petroleum applications of hydroprocessing, a means of delaying the effects of fouling has been addressed by installing filters in the hydrocarbon feedstream upstream of the catalyst bed to trap particulates.

Despite such improvements, pressure drop build-up can still limit the catalyst life cycle. There is thus a continuing need in the art to reduce reactor fouling in hydrogenation systems and methods, and to thereby extend the life of the catalyst bed(s).

SUMMARY

We have discovered that the foulants accumulating in hydrogenation catalyst beds may include metal compounds that are too small to be practically removed by filtration alone, but are magnetically susceptible and can be removed by magnetics applied to a feedstream before entering the catalyst bed.

In one embodiment, a hydrogenation reactor system comprises a magnetic conditioning zone, an inlet flow path to introduce a magnetically lean stream from the magnetic conditioning zone into a fixed catalyst bed and an outlet flow path from an outlet end of the catalyst bed to withdraw reactor effluent. In an embodiment a resin hydrogenation reactor system comprises a magnetic grate placed in an inlet flow path to contact a fluid feedstream upstream from a reactor and thereby remove magnetically susceptible particles. In an embodiment, the magnetic grate is disposed upstream from a filter in the reactor feedstream.

In another embodiment, a hydrocarbon hydrogenation method comprises passing a liquid feedstream through a magnetic field to separate magnetically susceptible particles, and introducing the magnetically lean stream into a fixed catalyst bed under hydrogenation conditions to saturate carbon-carbon double bonds in the hydrocarbon. In an embodiment, the method may further comprise passing the magnetically lean stream through a filter upstream from the catalyst bed. In a further embodiment, the method may comprise collecting the magnetically susceptible particles at a magnetic collection surface and periodically removing the collected particles.

DETAILED DESCRIPTION

Hydrogenation reactors may be used to hydrogenate unsaturated hydrocarbons, such as tackifying or other resins to remove color. Catalyst life is primarily limited due to the build-up of contaminants in a crust or upper region near the inlet (upper) surface of the fixed catalyst bed. Continued deposition of contaminants results in a loss of void volume as the interstices are filled, and a consequential increase in pressure drop across the catalyst bed. Eventually, the pressure drop approaches a predetermined alarm limit based upon the physical crush strength of the catalyst, and the reactor must be taken off-line for a catalyst change.

When catalyst is fouled, a thick crust is developed on the catalyst, particularly at the inlet of the reactor. An analysis of the crust, after removal of catalyst and catalyst-related components, indicated that the deposited materials were comprised primarily of carbon in the form of isentropic coke and iron compounds. The feedstreams for resin manufacture, for example, are often from several various sources, and often from bottoms streams of various hydrocarbon processing units, and it is theorized that such streams may carry the corrosion products from their respective processes, hence being a source of iron in the resin unit. Iron, as a process contaminant, can have a sub-micron particle size, making it difficult to remove by filtration at feasible filter sizes and pressure drops. For example, the use of 10 micron filters would be ineffective to remove sub-micron iron particles.

Figure 1A:
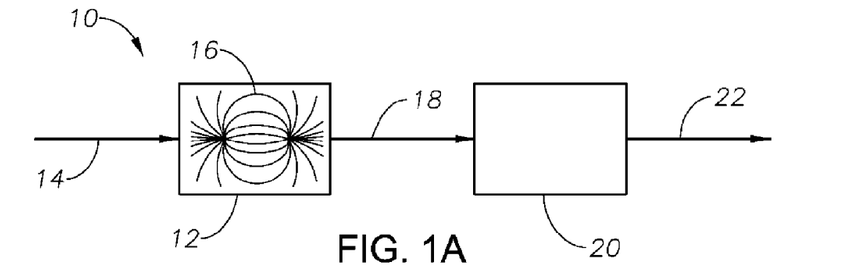
FIG. 1A schematically shows a process flow diagram for hydrogenating resin according to an embodiment of the invention.

With reference to FIG. 1A, a resin hydrogenation reactor system 10 in some embodiments herein comprises a magnetic conditioning zone 12 to pass a liquid hydrocarbon feedstream 14 through a magnetic field 16 to separate magnetically susceptible particles from the hydrocarbon and form a magnetically lean stream. As used herein, a "magnetically lean stream" refers to a stream having a reduced concentration of magnetically susceptible particles, by weight, relative to the hydrocarbon feedstream. In an embodiment, an inlet flow path 18 introduces the magnetically lean stream from the magnetic conditioning zone 12 into a fixed catalyst bed 20, and an outlet flow path 22 from an outlet end of the catalyst bed is provided to withdraw reactor effluent.

Figure 1B:
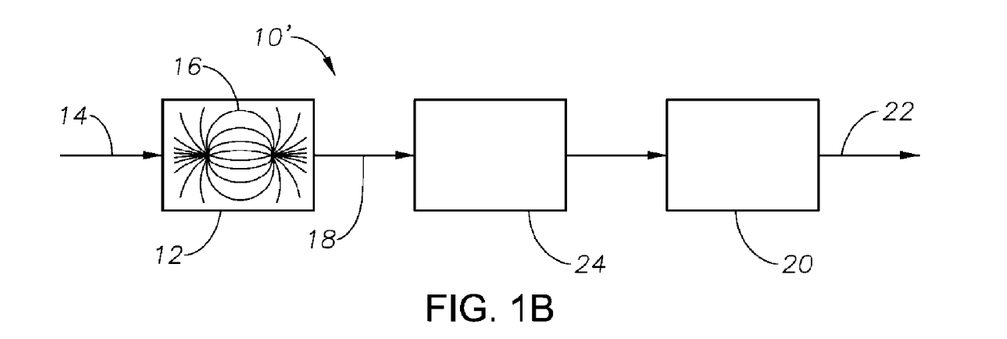
FIG. 1B schematically shows a process flow diagram for hydrogenating resin according to an embodiment of the invention.

With reference to FIG. 1B, in which like parts from FIG. 1A are represented by like numerals, the resin hydrogenation reactor system 10' may also include filter media 24 disposed in the inlet flow path between the magnetic conditioning zone 12 and the fixed catalyst bed 20. If desired, a plurality of the series of magnetic conditioning zone 12 and/or filter media 24 may be provided in parallel and/or series for treatment of split feedstreams, or for continued operation through one set (or more sets) of the magnetic conditioning zone 12 and/or filter media 24 while another set (or sets) are taken off line for servicing, e.g., removing accumulated particles from the magnetic conditioning zone 12 or replacing or re-magnetizing the magnets, or cleaning, replacing or repairing the filter elements in the filter media 24. Servicing of the magnetic conditioning zone 12 and/or filter media 24 may also be done while the fixed catalyst bed 20 is taken off-line, e.g., for catalyst regeneration or replacement.

Figure 1C:
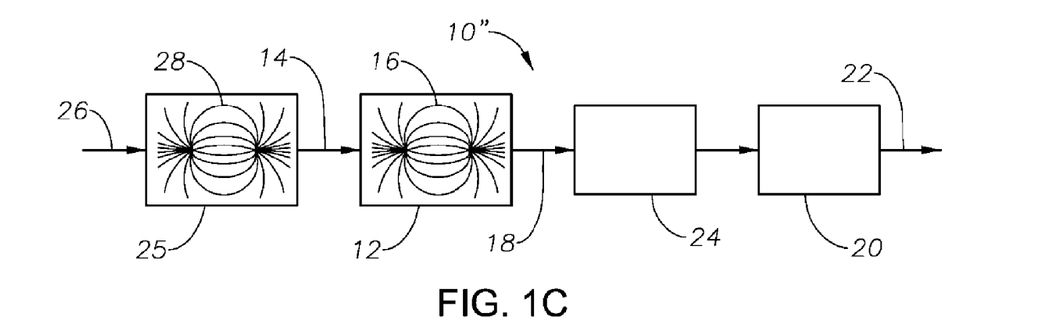
FIG. 1C schematically shows a process flow diagram for hydrogenating resin according to an embodiment of the invention.

In FIG. 1C, the resin hydrogenation reactor system 10" is the same as 10' in FIG. 1B but also includes an upstream process unit 25 that processes an upstream feed 26 to obtain the feedstream 14. For example, the process unit 25 may be a polymerization reactor, and the upstream feed 26 may be a monomer stream. In embodiments, the upstream process unit 25 includes a magnetic conditioning zone 28 to remove magnetically susceptible particles upstream from the feedstream 14, e.g., a magnetic field which may be disposed in or upstream from any pre-filter for the polymerization reactor.

Figure 2:
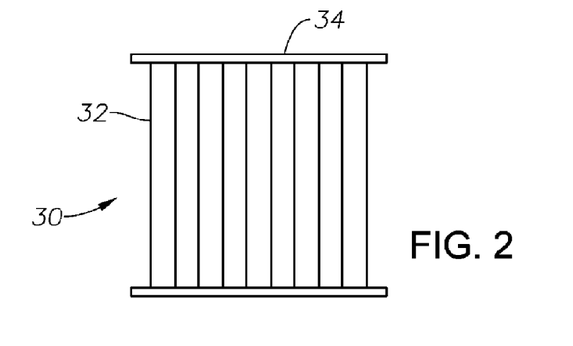
FIG. 2 shows a plan view of a magnetic grate according to an embodiment.
Figure 3:
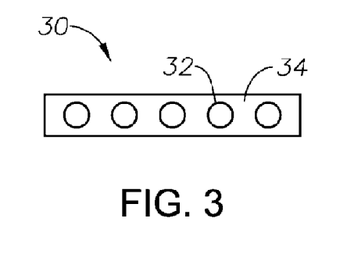
FIG. 3 shows an end view of the magnetic grate of FIG. 2.

In an embodiment, the magnetic conditioning zone 12 may comprise a permanent magnet, such as, for example, a ceramic or rare earth magnet or the like, or a ferromagnet, or an electromagnet. Alternatively or additionally, the magnetic conditioning zone may comprise a magnetic grate 30, as best seen in FIGS. 2-3, which may be conveniently positioned in the flow of the hydrocarbon. In an embodiment, the magnetic grate 30 may have a plurality of parallel, coplanar spaced-apart elongated elements 32 in the form of rods, bars, cylinders, etc., which are joined at respective ends by laterals 34. The elongated elements may comprise permanent magnets which may, if desired, be housed within or encased in casings, which may be made of stainless steel or another corrosion-resistant, magnetically permeable material. Magnetic grates are commercially available, for example, under the trade designation ERIEZ Model P grates.

Figure 4:
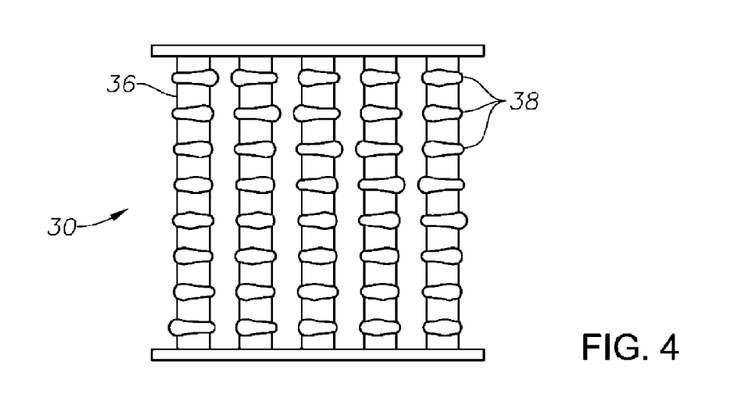
FIG. 4 shows a plan view of the magnetic grate of FIG. 2 following a period of magnetic conditioning of an iron-containing hydrocarbon feedstream and accumulation of magnetically susceptible particles thereon.

The magnetic elements 32 of the grate 30 should be sufficiently strong to attract and retain the magnetically susceptible materials with a greater force than the hydrodynamic resistance of the liquid flowing past the grate 30, so that the magnetic particles are attached to the magnetic elements 32 and accumulate on surfaces 36 thereof, e.g., at magnetic flux nodes 38 as illustrated schematically in FIG. 4. For example, the strength of the magnetic field may be determined by trial and error by placing the grate 30 in the liquid flow stream and periodically observing for particle accumulation, and if necessary increasing the strength of the magnet until sufficient particle accumulation is observed. In an embodiment, the magnets may have a magnetic strength in the range of from 4,000 to 11,000 gauss. In an embodiment, the magnetic elements may comprise a plurality of cylindrical magnets placed end-to-end N—S to form high-flux nodes at the adjacent ends.

Figure 5:
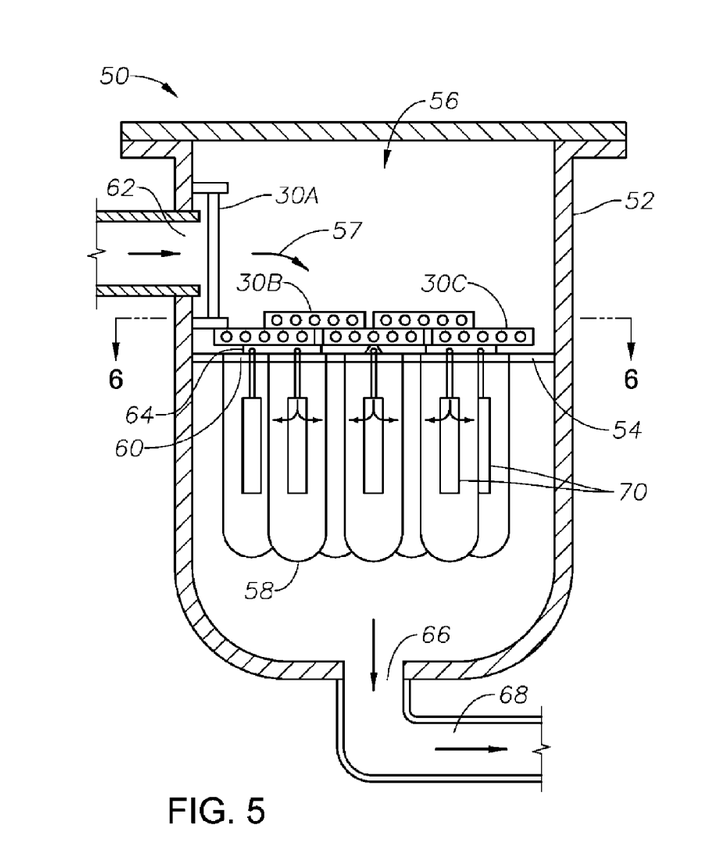
FIG. 5 shows an elevation view of magnetic grates placed in an upstream filter housing according to an embodiment.
Figure 6:
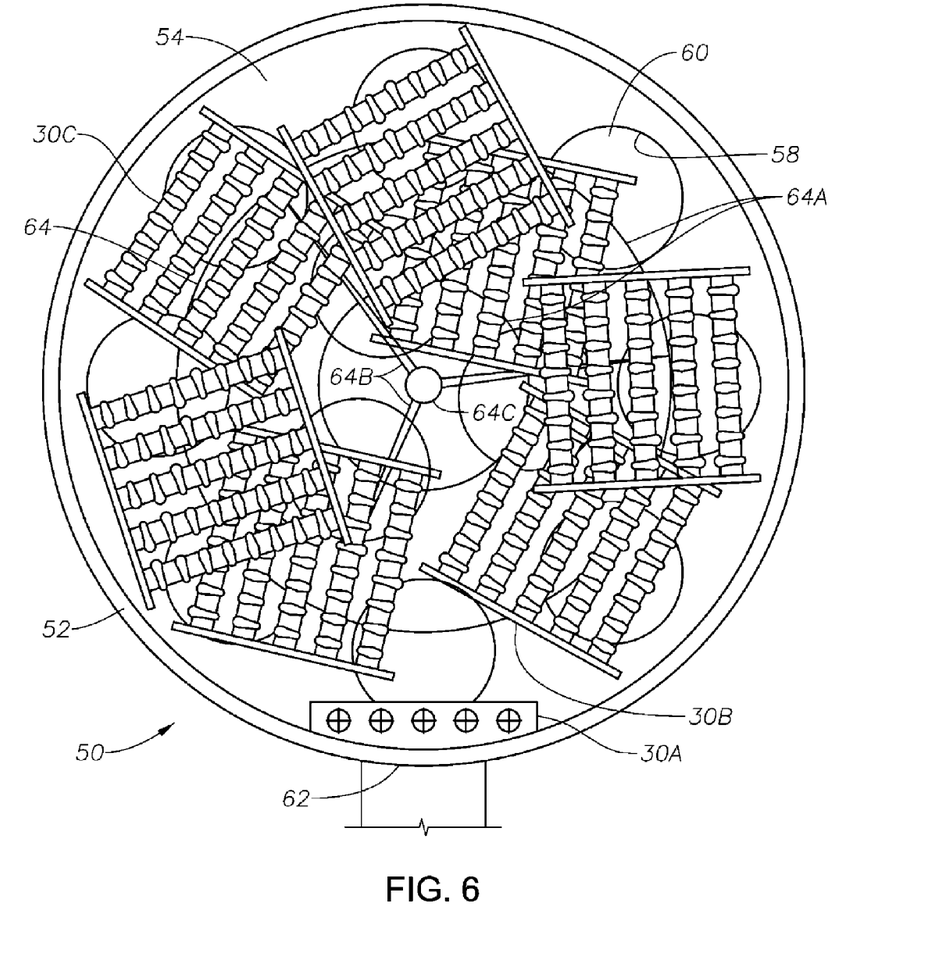
FIG. 6 shows a plan view of the filter housing assembly of FIG. 5 as seem along the lines 6-6.

In an embodiment, the magnets may be conveniently disposed in a housing for filter media. As illustrated in FIGS. 5-6, filter 50 may comprise a housing 52, a tube sheet 54 defining an inlet compartment 56 within the filter housing 52, and a plurality of filter elements 58 associated with respective passages 60 through the tube sheet. Magnetic grates 30 (see FIGS. 2-4) may be disposed in the inlet compartment 56 so as to contact the hydrocarbon flow 57 en route to the filter elements 58. For example, the grates may be arranged across the inlet opening 62 as in grate 30A, and/or in a plurality of layers of grates 30B, 30C stacked on a support element 64 over the filter elements 58. In an embodiment, as illustrated in FIG. 6, the support element 64 may be formed as a plurality of concentric rings 64A held on radial arms 64B secured at an axial bolt 64C. In embodiments, the number and pattern of deployment of grates 30A, 30B, 30C is effective such that all of the liquid entering each one of the filter elements 58 must pass through an opening in at least one of the grates 30A, 30B, 30C, preferably two or more of the grates 30A, 30B, 30C. Additionally, the grates 30B, 30C may be offset so that one or more openings in one of the grates 30B, 30C is aligned with a corresponding magnetic element in the other one of the grates 30B, 30C so as to promote passage of the magnetically susceptible particles in close proximity to at least one magnetic element. In an embodiment, the grates 30B, 30C may be more or less randomly positioned on the support element with the foregoing guidelines.

In the arrangement of this embodiment wherein the magnets are upstream from the filter elements 58, any aggregated particles on the magnets might be at least partially retained by the filter elements 58 should they become dislodged from a magnet, and thus at least partially prevented from exiting with the filtrate in the filter outlet flow port 66 into the flow path 68 to the fixed catalyst bed.

Figure 5A:
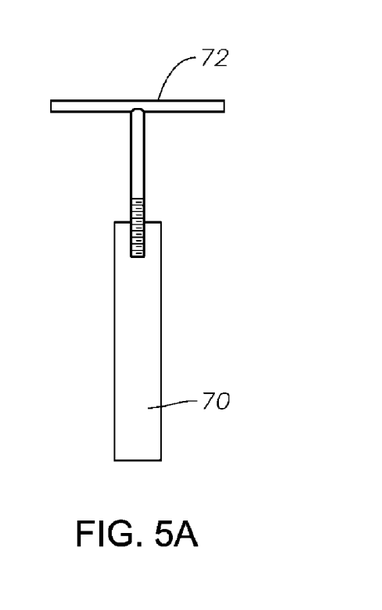
FIG. 5A shows a side view of the magnet assembly placed in the filter elements in FIG. 5.

In a further additional or alternative embodiment, magnets 70 may also be placed in the filter elements 58, e.g., where the filter elements 58 comprise sock filters the magnets 70 may simply be placed or dropped upstream in the filter bag. Figure 5A shows a side view of the magnet 70 connected to a T-handle 72 by which the magnet 70 may be suspended in the upper part of a filter element 58. The T-handle 72 may be threaded into a tapped end of the magnet 70. The T-handle 72 may have a transverse handle portion that has a length longer than the inside diameter of the filter element 58 to prevent the magnet 70 from being covered by filtered material accumulating inside the filter element 58 and to facilitate removal of the magnet 70.

A hydrogenation reactor system in some embodiments herein may comprise: a reactor vessel housing a fixed catalyst bed; an inlet flow path to introduce the magnetically lean stream into the reactor housing in fluid communication with an inlet surface of a foulant accumulation zone of the fixed catalyst bed; a bypass tube assembly comprising a plurality of tubes each comprising: an inlet opening at or above the inlet surface in fluid communication with the inlet flow path to receive the fluid, and fine openings through a cylinder wall to distribute the fluid into the fixed catalyst bed below the inlet surface; and an outlet flow path from a lower end of the catalyst bed to withdraw reactor effluent. The term "foulant accumulation zone" as used herein refers to a portion of the catalyst bed where catalyst foulants accumulate in higher concentration. In an embodiment, a total flow area through the fine openings of the cylinder walls is at least half of a net area of the inlet surface of the foulant accumulation zone around the plurality of the tubes.

The "total flow area" through the fine openings of the cylinder walls refers to the open area of all of the flow channels at their narrowest point, e.g., in the case of wedge wire tubes the minimum spacing between adjacent wires times the number of openings per unit length of tube times the length of each tube times the diameter of the tubes times pi times the number of tubes. Note that in the case of wedge wire tubes the initial total flow area is not corrected by the longitudinal rods where the opening is continuous at the outside diameter, or by the presence of catalyst or other particles that may occlude the openings. Also note that the total flow area may exceed the total cross sectional area of the tubes. The "net area" refers to the overall cross sectional area of the catalyst bed less the total cross sectional area of all of the tubes based on their outside diameters or other outer dimensions.

With reference to FIGS. 7-10, a catalyst bed 110 is shown which includes a bypass tube assembly 112, according to an embodiment. The catalyst bed comprises catalyst particles 114 usually randomly packed within the bed 110 within a reactor vessel (see FIG. 10) and around the tubes 116. If desired the catalyst bed 110 may include a top layer of inert elements 118 such as balls or cylinders, which can function as a sacrificial foulant accumulation zone since any catalyst in the uppermost layer would experience a relatively reduced level of catalyst utilization due to occlusion of catalyst surfaces by the foulants. The bypass tube assembly may be placed within the catalyst bed 110 so that it is supported by or floats on the catalyst particles 114 and/or inert elements 118 with the upper ends at or above the inlet surface of the catalyst bed 110 to inhibit solids entry from the catalyst bed 110 into the central flow passages of the tubes 116.

Figure 7:
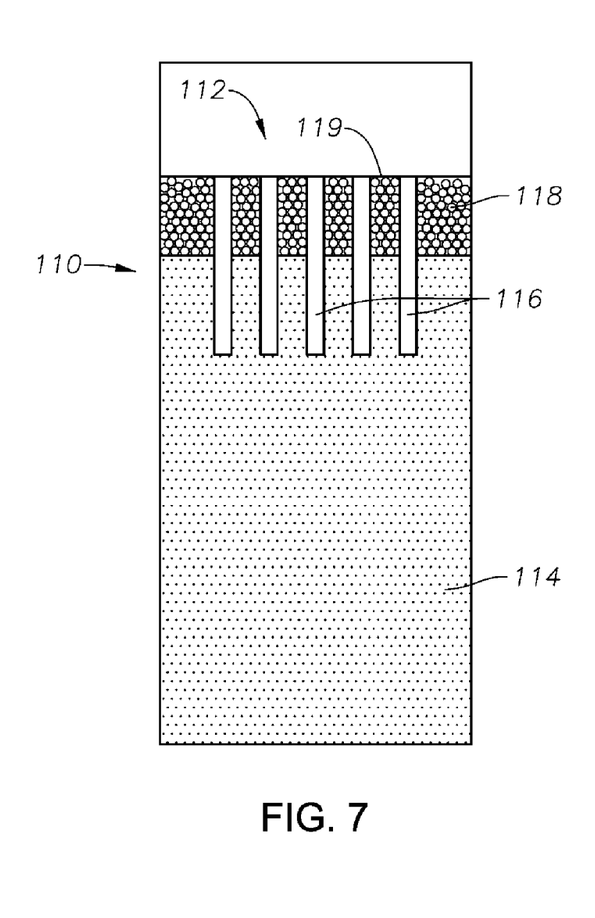
FIG. 7 schematically shows a catalyst bed in elevation according to an embodiment.

The tubes 116 have fine openings to allow fluid to pass but exclude solids of a relatively larger dimension. "Fine openings" as used herein is understood to refer to openings that have a diameter or smallest dimension that is less than the diameter or smallest dimension of the smallest solids in the catalyst bed. In embodiments, the fine openings have a diameter or smallest dimension (e.g., length or width) larger than the fines to be expected in the fluid feed so as to minimize plugging. The openings may be slots, bores, perforations, meshes, etc. In embodiments the fine openings are slots with a width of from 0.5 to 3 mm, or from 1 to 2 mm.

In an embodiment the tubes 116 are wedge wire tube screens formed by helically winding a triangular profiled wire around a series of vertical support rods and welded to the support rods at measured spacing usually with one of the flat sides of the wire as the circumference of the element. For example, wedge wire tube screens are commercially available under the trade designations JOHNSON, METSO, AMISTCO, DELTA SCREENS and so on. The spacing between the wires in the tubes 16 may be selected to be sufficiently small so as to exclude the catalyst particles 14, but not so small as to become easily plugged with solids or accretions from the feed fluid.

Figure 8:
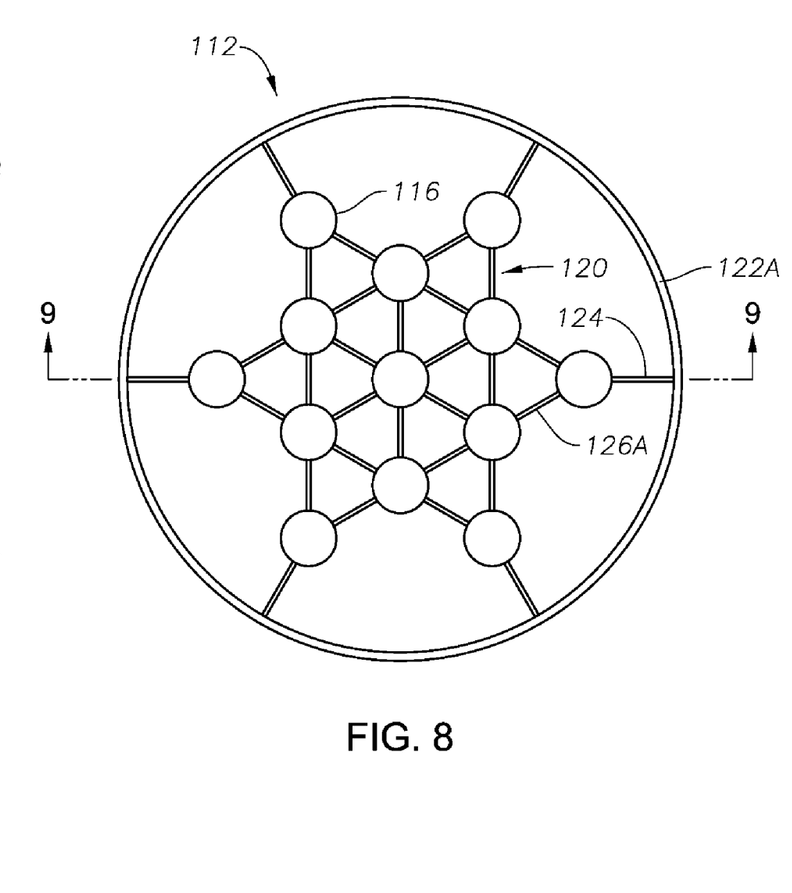
FIG. 8 shows a plan view of a bypass tube assembly according to an embodiment.

As best seen in FIGS. 7 and 8, the tube assembly 112 in an embodiment is made up of a plurality of upright or vertically oriented tubes 116 having an open end at or above the level of the inlet surface 119 of the catalyst bed 110 to inhibit solids entry from the catalyst bed. The bottom of the tubes 116 may be closed, e.g., with a 6.35 mm (¼-in.) metal plate. In embodiments, the upper end of the tubes 116 is at least level with the inlet surface 119, i.e., not below, or up to 150 mm above the inlet surface 119, or from 5 mm up to 50 mm above the inlet surface 119. If desired, the tubes 116 may be reinforced with bar stock per wedge wire manufacturer recommendation, e.g., 4.76 mm (³⁄₁₆-in.) bar stock.

In embodiments, each of the tubes 116 has a length, below the inlet surface 119 that is at least 1.5 times a hydraulic radius of the net area of the inlet surface of the foulant accumulation zone around the plurality of the tubes. The hydraulic radius as used in the specification and claims herein refers to the radius of a circle having an area equal to the specified area. The net area refers to the overall cross sectional area of the catalyst bed 110 less the total cross sectional area of all of the tubes 116. For example, where the hydraulic radius of the net area is 0.5 m, the tube length below the inlet surface should be 0.75 m or more. In embodiments, the tube length is greater than or equal to the sum of the depth of the inert layer 118 plus 1.5 times the hydraulic radius of the net area of the inlet surface of the foulant accumulation zone around the plurality of the tubes, e.g., where the hydraulic radius of the net area is 0.5 m and the depth of the inert layer is 0.2 m, the tube length below the inlet surface should be 0.95 m or more. In embodiments, the tube length should not be so great as to interfere with internals within the bed 110, e.g., thermocouples or the like. In embodiments, the tube length is less than 2 m or less than 1.8 m; or less than 20% or less than 15% of the overall height of the catalyst bed 110.

Figure 9:
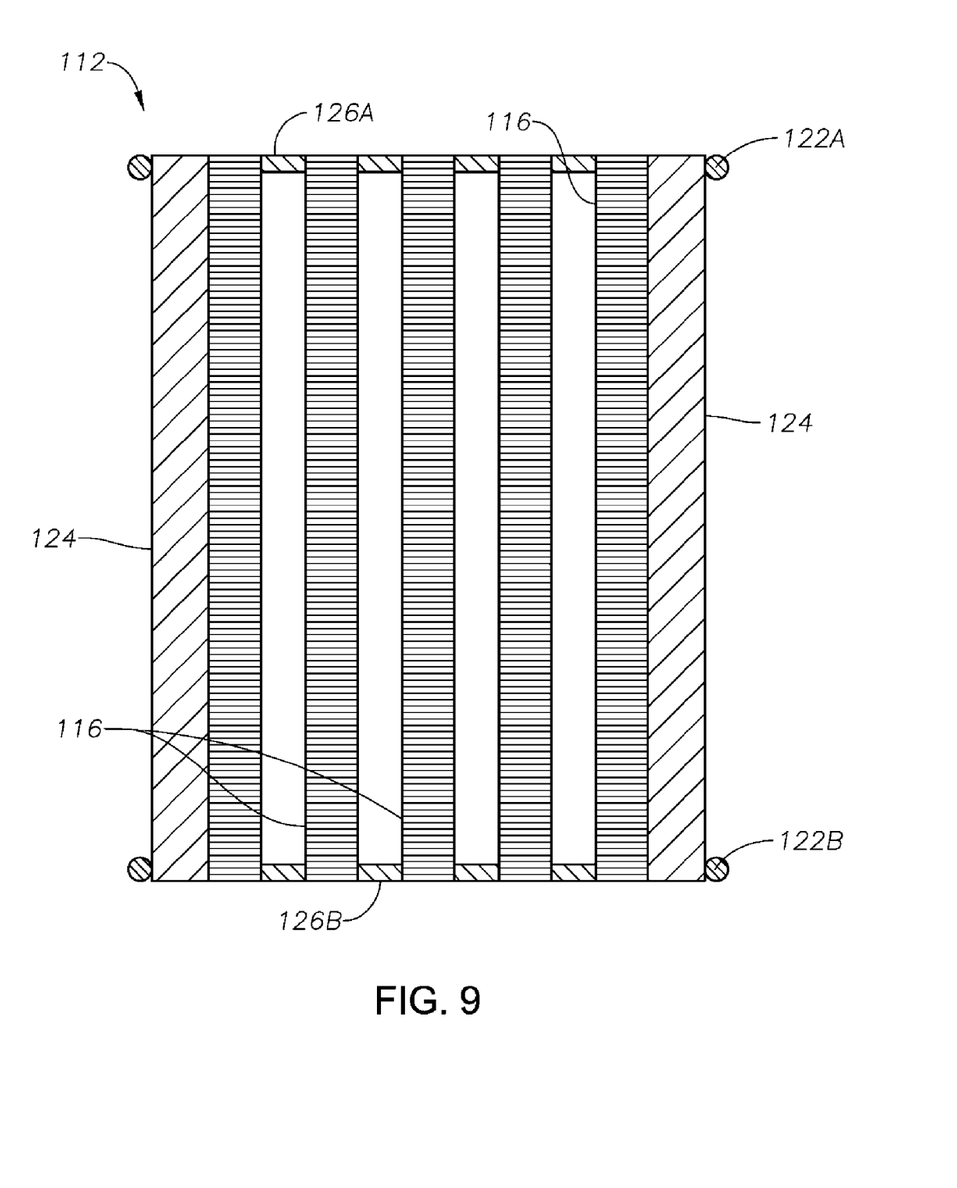
FIG. 9 shows an elevation view of the bypass tube assembly of FIG. 8 as seen along the lines 9-9.

In embodiments, the tube assembly 112 includes a framework 120 as best seen in FIGS. 8 and 9, which may have one or more outer rings 122A, 122B, e.g., upper ring 122A and lower ring 122B, outer bracings 124 between outer ones of the tubes 16 and the rings 122A, 122B, and one or more bracings 126A, 126B between adjacent ones of the tubes 116. One or both of the rings 122A, 122B may be continuous through 360 degrees, or in another embodiment, may have a section(s) removed between radially adjacent ones of the outer bracings 124 to accommodate internals in the fixed bed 120 and/or to facilitate handling, placement and/or removal of the tube assembly 112. The rings 122A, 122B may be made from any suitable material, e.g. 6.35 mm (¼-in.) round stock. The bracings 124 may be coextensive with the tubes 116 and span between the rings 122A, 122B, and may be fabricated from metal sheet or plate, e.g., 10 gauge (3.4 mm) metal sheet. The bracings 126A, 126B may be made from metal bar stock, e.g., 76 mm (³⁄₁₆-in.) bar stock.

In an embodiment, a total cross section flow area of the bypass tube assembly within the tubes comprises from 8 to 20 percent of the net area of the inlet surface of the foulant accumulation zone around the plurality of the tubes, e.g., from 8 to 15 percent of the net area or from 10 to 12 percent of the net area. The tubes 116 may be evenly spaced within the tube assembly 116, e.g., oriented on a triangular or square pitch, or in evenly spaced rows wherein the spacing between tubes within a row is the same as or different from the spacing between the rows. In an embodiment, the bypass tube assembly 112 comprises a center-to-center tube spacing of at least 1.2, at least 1.5 or 2 tube diameters or more. In an embodiment, the outermost ones of the tubes 16 are arranged with axes in a circle having a diameter that is at least 40 percent of the diameter of the catalyst bed 10, or at least 50 percent of the diameter of the catalyst bed 10, or at least 55 percent of the diameter of the catalyst bed 10. In embodiments, the axes of the tubes 116 are spaced at least 2 tube diameters from the diameter or edge of the catalyst bed 10, or at least 3 tube diameters from the diameter or edge of the catalyst bed 110 at least 4 tube diameters from the diameter or edge of the catalyst bed 110, e.g., up to 6 tube diameters from the diameter or edge of the catalyst bed 110.

Figure 10:
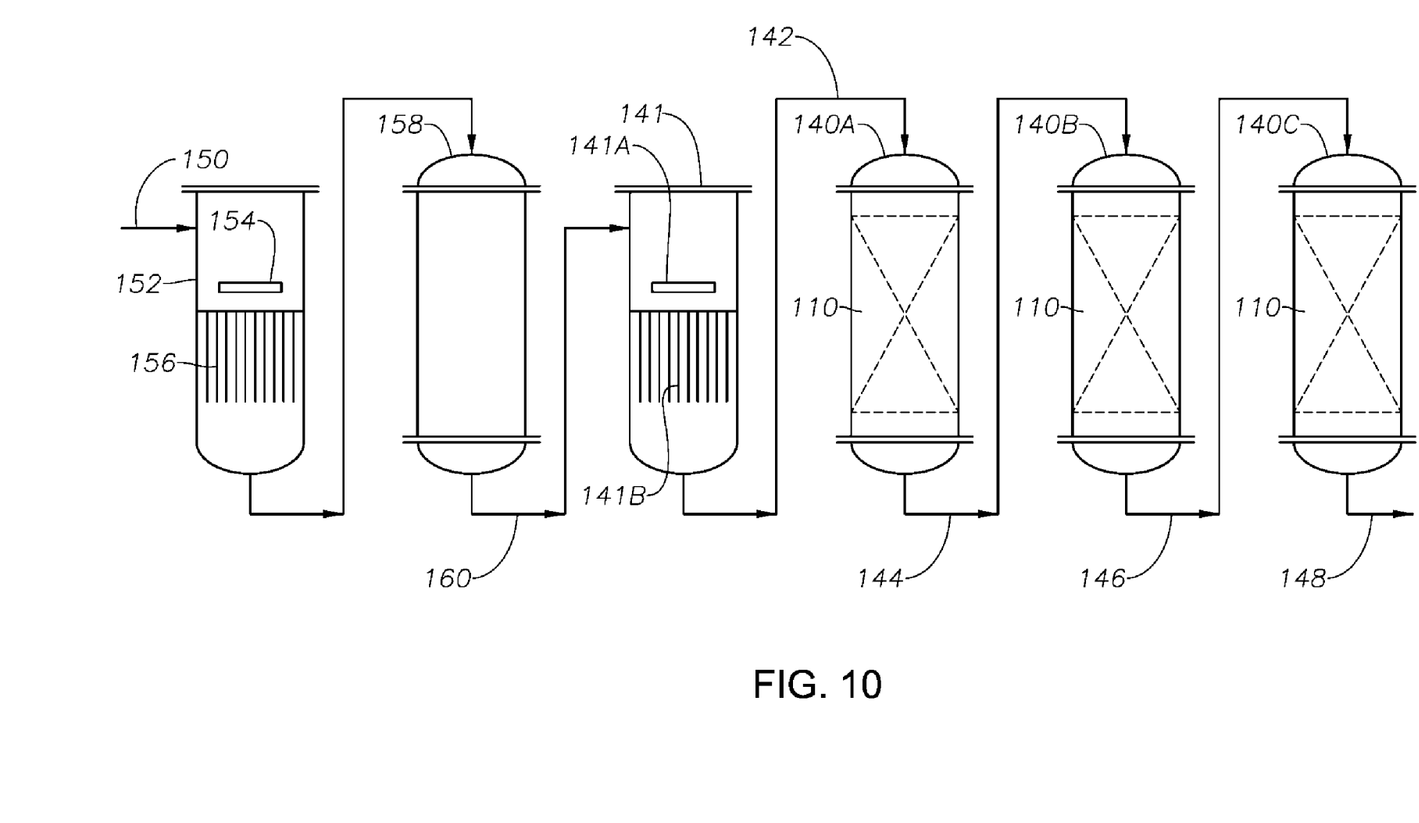
FIG. 10 shows a schematic flow diagram for hydrogenation with a series of reactors according to an embodiment.

In embodiments with reference to FIG. 10, the catalyst bed 110 may be placed within or defined by the inside surface(s) of one or more hydrogenation reactors 140A, 140B, 140C, which may be operated in series downstream from the filter 141 housing the magnetic conditioning zone 141A and the filter elements 141B. The process is operated more or less continuously to hydrogenate unsaturated, magnetically lean resin feed 142 with hydrogen in the reactors 140A, 140B, 140C in series, i.e., with the reactor effluent 144 from the first reactor 140A supplied next to reactor 140B, and thence the reactor effluent 146 from the second reactor 140B supplied ultimately to reactor 140C, from which the product stream 148 is obtained. Hydrogen supplementation or removal, cooling, heating, pumping, compression, purification, etc. may be employed upstream from reactor 140A, between the reactor stages 140A/140B or 140B/140C and/or downstream from reactor 140C as desired. If additional magnetic particle removal is desired, upstream from the filter 141, a hydrocarbon monomer feed 150 may be passed through a filter 152 housing an upstream magnetic conditioning zone 154 and filter elements 156, and thence to a polymerization reactor 158 to obtain the resin feedstream 160 for supply to the filter 141.

The catalyst life in the hydrogenation reactors is generally limited by the pressure drop in the first reactor in the series since the subsequent reactors receive the effluent from the previous reactor(s) which has been effectively filtered by removing some of the entrained particles or other foulants from the initial feedstock stream. In turn, the maximum allowable pressure drop in any given reactor is generally limited by the physical crush strength of the catalyst since if the catalyst is crushed it may precipitously generate fines and/or lose permeability, effectively stopping fluid flow through the reactor(s). Thus the use of the magnetic conditioning and filtration of the feed upstream from, and the use of the bypass tube assembly in, at least the first reactor in the series is preferred, whereas in an embodiment the subsequent reactors may not benefit as much from the use of the magnetic conditioning, filtration and bypass tube assembly between catalyst stages in series where the concentration of foulant materials may be lower.

In operation, pressure drop increases will occur in the process of hydrogenating resin, as impurities enter the process, e.g., coke fines, corrosion products, solid polymers. These impurities, to the extent they are not captured by magnetic conditioning and/or filtration as described herein, can fill the void space in the initial catalyst depth, thus increasing the pressure drop through the catalyst bed 110. Fouling in this process is believed to be the result of waxy paraffins, organic insolubles, polymer solids, coke fines, fine particles of metal oxides, and the like. Such potential foulants may promote the formation of a crust at the top of the catalyst bed 110, including any inert ball layer, and the first 100-600 mm of catalyst. The magnetic conditioning and filtration of the feed serve to reduce the rate of crust formation, while the bypass tube assembly serves to bypass the low-permeability crust, or can also be considered as increasing the area available for fluid flow into the catalyst bed.

In traditional resin hydrogenation, the pressure buildup from loss of permeability of the catalyst bed has been the limiting factor for catalyst utilization, since the pressure drop is not normally allowed to increase to the point where there would be a risk of catalyst crushing. With the use of the magnetic conditioning, filtration and bypass assembly as disclosed herein, however, the catalyst utilization may be extended to the point where pressure buildup is not the ultimate limiter, and the catalyst can be continued to be used until it loses activity, i.e., conversion rates drop, e.g., when product color specifications are no longer met.

In embodiments, any feedstream comprising unsaturated hydrocarbons can be hydrogenated to at least partially saturate the carbon-carbon double bonds. In an embodiment, the fluid feedstream comprises an unsaturated hydrocarbon resin and hydrogen, and wherein the catalyst bed comprises a metal oxide or metal sulfide hydrogenation catalyst. As used herein, an "unsaturated hydrocarbon" is one containing carbon-carbon double bonds.

In an embodiment, the foulant accumulation zone of the fixed catalyst bed comprises a layer of inert particles adjacent the inlet surface. As used herein, "inert" refers to a material having no or negligible catalytic activity for the hydrogenation reaction. In an embodiment, the inert particles have a physical crush strength that is at least equal to that of the catalyst particles.

In an embodiment, the total flow area through the fine openings of the walls is equal to or greater than the net area of the inlet surface of the foulant accumulation zone around the plurality of the tubes. In an embodiment, each of the tubes in the bypass tube assembly has a length, below the inlet surface foulant accumulation zone of the fixed catalyst bed, from 1.5 to 3 times a hydraulic radius of the net area of the inlet surface of the foulant accumulation zone around the plurality of the tubes. In an embodiment, a total cross section flow area of the bypass tube assembly within the tubes comprises from 8 to 20 percent of the net area of the inlet surface of the foulant accumulation zone around the plurality of the tubes. In an embodiment, the bypass tube assembly comprises a center-to-center tube spacing of at least two tube diameters.

In an embodiment, the system comprises a plurality of the reactor vessels, wherein the reactor vessels are connected in series downstream from the magnetic conditioning zone. In an embodiment, the bypass tube assembly may also be present in at least the first reactor vessel and optionally in the subsequent reactor vessels.

In an embodiment, the bypass tube assembly comprises a framework to hold the tubes in fixed relative position with respect to each other. In an embodiment, the framework comprises a tube bundle comprising bracing between adjacent tubes and bracing extended radially outwardly from the tube bundle to a connecting ring. In an embodiment, the bypass tube assembly is supported by the catalyst bed free of the reactor housing. In an embodiment, the tubes comprise wire mesh tubes.

In an embodiment, a method to hydrogenate hydrocarbon resin, comprises: passing a liquid hydrocarbon resin feedstream through a magnetic field to separate magnetically susceptible particles from the hydrocarbon and form a magnetically lean stream; and introducing the magnetically lean stream into a fixed catalyst bed under hydrogenation conditions to saturate at least a portion of the carbon-carbon double bonds in the hydrocarbon resin. In an embodiment, the method further comprises passing the magnetically lean stream through a filter upstream from the catalyst bed. In an embodiment, the method further comprises collecting the magnetically susceptible particles at a magnetic collection surface and periodically removing the collected particles. In an embodiment, the magnetic field is generated by a rare earth magnet.

In an embodiment, the method may further comprise accumulating foulants in a zone adjacent an inlet surface of the catalyst bed. In an embodiment the method may further comprise introducing one portion of the magnetically lean stream to the inlet surface, and introducing another portion of the magnetically lean stream into the catalyst bed through a tube assembly to bypass the inlet surface, wherein the tube assembly comprises a plurality of tubes each comprising an inlet opening at or protruding above the inlet surface and fine openings through a cylinder wall extending into the catalyst bed below the inlet surface. In an embodiment, the method may also include providing an initial total flow area through the fine openings of the cylinder walls that is at least half of a net area of the inlet surface of the foulant accumulation zone around the plurality of the tubes, and recovering a hydrogenated effluent stream from the catalyst bed. In an embodiment, the initial total flow area through the fine openings of the cylinder walls is equal to or greater than the net area of the inlet surface of the foulant accumulation zone around the plurality of the tubes. In an embodiment, the method may also include loading a layer of inert particles in the catalyst bed adjacent the inlet surface. In an embodiment, each of the tubes in the bypass tube assembly has a length, below the inlet surface foulant accumulation zone of the fixed catalyst bed, that is from 1.5 to 3 times a hydraulic radius of the net area of the inlet surface of the foulant accumulation zone around the plurality of the tubes, wherein a total cross sectional flow area of the bypass tube assembly within the tubes comprises from 8 to 20 percent of the net area of the inlet surface of the foulant accumulation zone around the plurality of the tubes, and wherein the bypass tube assembly comprises a center-to-center tube spacing of at least two tube diameters. In an embodiment, the method may also include passing the fluid feedstream through a plurality of the catalyst beds in series, each catalyst bed comprising a said bypass tube assembly. In an embodiment, the method may also include periodically replacing the catalyst bed when a pressure differential across the catalyst bed is from 4 to 15 times an initial pressure differential across the catalyst bed after loading the catalyst. In an embodiment, the catalyst may reach the end of its useful life and be changed before a predetermined maximum allowable pressure differential is reached. In an embodiment, the pressure differential across the catalyst bed is maintained below the physical crush strength of the catalyst, e.g., less than 50% of the physical crush strength of the catalyst. In embodiments, the method comprises periodically replacing the catalyst bed if a pressure differential across the catalyst bed is within a range of 30 to 50% of a physical crush strength of the catalyst. The crush strength may be determined in accordance with ASTM D4179 where the catalyst comprises regularly shaped particles, or in accordance with ASTM D7084 where the catalyst comprises extrudates, granular materials, or other irregularly shaped particles.

In an embodiment, the method further comprises loading catalyst particles into the catalyst bed and installing the bypass tube assembly at the inlet surface of the catalyst bed.

In an embodiment, the method further comprises passing the fluid feedstream through a plurality of the catalyst beds in series, wherein at least the first catalyst bed comprises a said bypass tube assembly. In an embodiment, the method further comprises floating the bypass tube assembly in the catalyst bed.

The catalyst referred to herein is generally useful in a process for hydrogenating or hydrotreating (used interchangeably herein) a catalytically or thermally prepared hydrocarbon resin in the presence of the catalyst. Any of the known metal catalysts and/or processes for catalytically hydrogenating hydrocarbon resins can be modified in accordance with the present disclosure by substituting the catalyst system and/or processing steps, in particular the processes and metal catalysts of U.S. Pat. No. 6,755,963, U.S. Pat. No. 5,171,793, U.S. Pat. No. 4,629,766, U.S. Pat. No. 4,328,090, EP 0 240 253, EP 0 082 726 and WO 95/12623 are suitable, each of which is referred to and incorporated herein by reference in their entireties for all purposes. "Metal" in the context of the catalyst does not necessarily mean the metal in its metallic form but present in any metal compound, such as the metal component as initially applied or as present in a bulk or supported catalyst composition, e.g., metal oxides and/or especially in the active state as metal sulfide. A nickel molybdotungstate denitrogenation catalyst which may also be employed herein is disclosed in WO 99/03578, which is incorporated herein by reference in its entirety for all purposes. The nickel molybdotungstate catalyst in WO 99/03578 is prepared by decomposing a nickel (ammonium) molybdotungstate precursor and sulfiding the decomposition product, either pre-use or in situ.

EP 0 082 726 describes a process for the hydrogenation of petroleum resins from catalytic or thermal polymerization of olefin- and diolefin-containing streams, using nickel-tungsten catalyst on a gamma-alumina support wherein the hydrogen pressure is 14.7-19.6 MPa and the temperature is in the range of 250° C.-330° C. The polymerization feedstreams are said to contain $C_5$ and/or $C_6$ olefin and/or diolefin streams, and, for catalytic polymerization, $C_8/C_9$ aromatic olefins, e.g., styrene, vinyl benzene and optionally indene. Thermal polymerization is usually done at 160° C. to 320° C., at a pressure of 0.98 to 1.17 MPa and for a period typically of 1.5 to 4 hours. After hydrogenation the reactor mixture may be flashed and further separated to recover the hydrogenated resin. Steam distillation may be used to eliminate oligomers, without exceeding 325° C. resin temperature in one embodiment.

Catalysts employed for the hydrogenation of hydrocarbon resins are typically supported monometallic, bimetallic or multimetallic catalyst systems based on elements from Group 6, 8, 9, 10, or 11 of the Periodic Table of Elements. Bulk multimetallic catalysts in an embodiment are comprised of at least one Group VIII non-noble metal and at least two Group VIB metals and wherein the ratio of Group VIB metal to Group VIII non-noble metal is from about 10:1 to about 1:10, e.g., a nickel molybdotungstate catalyst, as described in U.S. Pat. No. 6,755,963. In one embodiment, the catalyst is supported, e.g., on an inert material such as metal oxide such as alumina (e.g., gamma-alumina), silica or the like, which may function as a binder to hold the metal catalyst compounds at the interstitial surfaces of the pores. In another embodiment the catalyst is unsupported, i.e. a bulk catalyst prepared without a binder.

The Group VIB metal in one embodiment comprises chromium, molybdenum, tungsten, or mixtures thereof. Group VIII non-noble metals in one embodiment are, e.g., iron, cobalt, nickel, or mixtures thereof. In an embodiment, the catalyst comprises a combination of metal components comprising nickel, molybdenum and tungsten or nickel, cobalt, molybdenum and tungsten. In an embodiment, nickel components used to prepare the catalyst may comprise water-insoluble nickel components such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof. In an embodiment, molybdenum components used to prepare the catalyst may comprise water-insoluble molybdenum components such as molybdenum (di- and tri) oxide, molybdenum carbide, molybdenum nitride, aluminum molybate, molybdic acid (e.g. $H_2MoO_4$), molybdenum sulfide, or mixtures thereof; or water-soluble nickel components, e.g. nickel nitrate, nickel sulfate, nickel acetate, nickel chloride, or mixtures thereof. In an embodiment, tungsten components used to prepare the catalyst may comprise tungsten di- and trioxide, tungsten sulfide ($WS_2$ and $WS_3$), tungsten carbide, tungstic acid (e.g. $H_2WO_4$—$H_2O$, $H_2W_4O_{13}$-$9H_2O$), tungsten nitride, aluminum tungstate (also meta-, or polytungstate) or mixtures thereof. In an embodiment, the catalyst may be made from and/or contain water-soluble molybdenum and tungsten components such as alkali metal or ammonium molybdate (also peroxo-, di-, tri-, tetra-, hepta-, octa-, or tetradecamolybdate), Mo—P heteropolyanion compounds, Wo—Si heteropolyanion compounds, W—P heteropolyanion compounds, W—Si heteropolyanion compounds, Ni—Mo—W heteropolyanion compounds, Co—Mo—W heteropolyanion compounds, alkali metal or ammonium tungstates (also meta-, para-, hexa-, or polytungstate), or mixtures thereof. In an embodiment, combinations of metal components comprising the catalyst are nickel carbonate, tungstic acid and molybdenum oxide; or nickel carbonate, ammonium dimolybdate and ammonium metatungstate.

The hydrogenation catalyst is generally comprised of porous metal and/or support components having a typical total pore volume and pore size distribution of conventional hydrotreating catalysts, e.g., a pore volume of 0.05-5 ml/g, or of 0.1-4 ml/g, or of 0.1-3 ml/g or of 0.1-2 ml/g determined by nitrogen adsorption. Pores with a diameter smaller than 1 nm may be but are generally not present. Further, the catalysts generally have a surface area of at least 10 $m^2/g$, or at least 50 $m^2/g$ or at least 100 $m^2/g$, determined via the Brunauer-Emmett-Teller (B.E.T.) method. For instance, nickel carbonate has a total pore volume of 0.19-0.39 ml/g or of 0.24-0.35 ml/g determined by nitrogen adsorption and a surface area of 150-400 $m^2/g$ or of 200-370 $m^2/g$ determined by the B.E.T. method. Furthermore, the catalyst particles can have a median particle diameter of at least 50 nm, or at least 100 nm, or not more than 5 mm or not more than 3 mm. In one embodiment, the catalyst particles are generally cylindrical, trilobate, quadrilobate or the like and prepared by cutting an extrudate of the desired profile, e.g., from 1 to 6 mm in diameter and from 2 to 12 mm in length, such as 4 mm long and 2 mm in diameter.

The term hydrocarbon resin as used in the specification and claims include the known high molecular weight polymers, low molecular weight polymers and oligomers derived from cracked petroleum distillates, coal tar, turpentine fractions and a variety of pure monomers. The number average molecular weight is usually below 10,000 or below 2000, and physical forms at ambient conditions range from thin or thick viscous liquids to hard, brittle solids. Oligomers refer to dimers, trimers, tetramers, pentamers, hexamers, octamers and the like, including combinations thereof, of olefinic monomers, e.g., olefins and diolefins. Polymerization feedstreams are derived from hydrocarbon refining and cracking streams via various known means and methods of fractionation. For a description of feedstream derivation, monomer composition, methods of polymerization and hydrogenation, reference may be made to the patents referred to herein and to technical literature, e.g., Hydrocarbon Resins, Kirk-Othmer Encyclopedia of Chemical Technology, V. 13, pp. 717-743 (J. Wiley & Sons, 1995); Encycl. of Poly. Sci. and Eng., Vol. 7, pp. 758-782 (J. Wiley & Sons, 1987), and the references cited in both of them. All of these references are incorporated by reference for purposes of U.S. patent practice.

Suitable hydrocarbon resins may include both aromatic and nonaromatic components. Differences in the hydrocarbon resins are largely due to the olefins in the feedstock from which the hydrocarbon components are derived. The hydrocarbon resin may contain "aliphatic" hydrocarbon components which have a hydrocarbon chain formed from $C_4$-$C_6$ fractions containing variable quantities of piperylene, isoprene, mono-olefins, and non-polymerizable paraffinic compounds. Such hydrocarbon resins are based on pentene, butene, isoprene, piperylene, and contain reduced quantities of cyclopentadiene or dicyclopentadiene. The hydrocarbon resin may also contain "aromatic" hydrocarbon structures having polymeric chains which are formed of aromatic units, such as styrene, xylene, α-methylstyrene, vinyl toluene, and indene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene, dicyclopentadiene, cyclohexene, 1,3-cyclohexadiene, and 1,4-cyclohexadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In at least one embodiment, the hydrocarbon resin may include up to 20% cyclics or more preferably up to 30% cyclics. In a particularly preferred embodiment, the hydrocarbon resin comprises from about 1.0 to about 15% cyclics, or from about 5 to about 15% cyclics.

Aromatics that may be in the hydrocarbon resin include one or more of styrene, indene, derivatives of styrene, and derivatives of indene. Specific representative aromatic olefins include styrene, α-methylstyrene, β-methylstyrene, indene, and methylindenes, and vinyl toluenes. In another embodiment, the hydrocarbon resin comprises from 10 to 20 wt % aromatic olefins. Styrenic components include styrene, derivatives of styrene, and substituted sytrenes. In general, styrenic components do not include fused-rings, such as indenics. In one embodiment, the hydrocarbon resin comprises from 5 to 30% styrenic components, or from 5 to 20% styrenic components. In an embodiment, the hydrocarbon resin comprises from 10 to 15% styrenic components. The hydrocarbon resin may comprise less than 15% indenic components, or less than 10% indenic components. Indenic components include indene and derivatives of indene. In one embodiment, the hydrocarbon resin comprises less than 5% indenic components. In another embodiment, the hydrocarbon resin is substantially free of indenic components.

The rosins capable of hydrotreating with the catalyst in accordance herewith include any of those known in the art to be suitable as tackifying agents, specifically including the esterified rosins. The principal sources of the rosins include gum rosins, wood rosin, and tall oil rosins which typically have been extracted or collected from their known sources and fractionated to varying degrees. Additional background can be obtained from technical literature, e.g., Kirk-Othmer Encyclopedia of Chemical Technology, Vol. 17, pp. 475-478 (John Wiley & son, 1968) and Handbook of Pressure-Sensitive Adhesive Technology, ed. by D. Satas, pp. 353-356 (Van Nostrand Reinhold Co., 1982).

In embodiments, the catalyst particles are loaded, e.g., from the storage and/or shipping containers, into hydrogenation reactors using conventional catalyst loading equipment and techniques. The catalyst may be initially loaded up to a level in the bed that corresponds to the bottom of the bypass tube assembly 12, the bypass tube assembly then placed in the reactor vessel on top of the catalyst bed, and the remainder of the catalyst added to the bed around the bypass tubes 16, followed finally by any inert material layer.

In an embodiment the catalyst bed can be used to hydrogenate any organic compound capable of catalytic hydrogenation or reduction, such as, for example, alkenes, alkynes, aldehydes, ketones, esters, imines, amides, nitriles, nitro compounds, sulfo compounds, combinations thereof and the like, and also including mixtures of such organic compounds in or with other compounds that are generally inert to hydrogenation. In one specific embodiment, the catalyst is used to hydrogenate a hydrocarbon resin. The hydrocarbon resins which are hydrogenated may be any of the hydrocarbon resins discussed above. The hydrogenation of the hydrocarbon resin may be carried out by any method known in the art, and the invention is not limited by the method of hydrogenation. For example, the hydrogenation of the hydrocarbon resin may be either a batchwise or a continuous process.

Generic hydrogenation treating conditions include reactions in the temperature of about 100° C.-350° C. and pressures of between five atmospheres (506 kPa) and 300 atm (30.4 MPa) hydrogen, for example, 10 to 275 atm (1.01 MPa to 27.6 MPa). In one embodiment the temperature is in the range including 180° C. and 320° C. and the pressure is in the range including 15.2 MPa and 20.3 MPa hydrogen. The hydrogen to feed volume ratio to the reactor under standard conditions (25° C., 1 atm pressure) typically can range from 20-200.

Hydrogenated polymeric resin products which may be made with the reactor system and/or method described herein specifically include hydrocarbon resins suitable as tackifiers for adhesive compositions, particularly adhesive compositions comprising polymeric base polymer systems of either natural or synthetic elastomers, including such synthetic elastomers as those from styrene block copolymers, olefinic rubbers, olefin derived elastomers or plastomers, and various copolymers having elastomeric characteristics, e.g., ethylene-vinyl ester copolymers. Such adhesive compositions find particular utility in hot melt adhesive and pressure sensitive adhesive applications such as those for adhesive tapes, diaper tabs, envelopes, note pads, and the like. Often compatibility of the tackifier with polymeric base polymer systems is best achieved by selection of a hydrocarbon resin that is high in aromatic monomer content. Concurrently it is sought to select a tackifier that has color characteristics commensurate with those of the base polymer system, preferably both the polymer system and its tackifier will be essentially transparent and low in chromophores, that is, color. Retention of this low color characteristic is important during heating operations such as those present in formulation by melt processing and application of the adhesive compositions to substrate materials under elevated temperatures. Adequate hydrogenation is known to achieve desirable heat stability of low color properties in polymeric hydrocarbon resins made from either aliphatic or aromatic monomers, or mixes thereof. Both objectives can be achieved by use of the equipment and/or process of the present invention.

Accordingly, the invention provides the following embodiments:

1. A hydrogenation reactor system, comprising:
   a magnetic conditioning zone to pass a liquid hydrocarbon feedstream through a magnetic field to separate magnetically susceptible particles from the hydrocarbon and form a magnetically lean stream;
   an inlet flow path to introduce the magnetically lean stream from the magnetic conditioning zone into a fixed catalyst bed; and
   an outlet flow path from an outlet end of the catalyst bed to withdraw reactor effluent.

2. The hydrogenation reactor system of embodiment 1, wherein the magnetic conditioning zone comprises a permanent magnet.

3. The hydrogenation reactor system of embodiment 1 or embodiment 2, wherein the magnetic conditioning zone comprises a rare earth magnet.

4. The hydrogenation reactor system of any one of embodiments 1 to 3, wherein the magnetic conditioning zone comprises a magnetic grate.

5. The hydrogenation reactor system of any one of embodiments 1 to 4, further comprising filter media disposed in the inlet flow path between the magnetic conditioning zone and the fixed catalyst bed.

6. The hydrogenation reactor system of embodiment 5, wherein the filter media comprises a fabric sock filter.

7. The hydrogenation reactor system of embodiment 6, further comprising a magnet disposed in a sock of the fabric sock filter.

8. The hydrogenation reactor system of any one of embodiments 1 to 7, wherein the liquid hydrocarbon feedstream comprises an unsaturated hydrocarbon resin.

9. The resin hydrogenation reactor system of embodiment 8, further comprising a polymerization reactor to convert a monomer feedstream to the unsaturated hydrocarbon resin, and an upstream magnetic conditioning zone to remove magnetically susceptible particles from the monomer feedstream upstream from the polymerization reactor.

10. The hydrogenation reactor system of any one of embodiments 1 to 10, wherein the fixed catalyst bed comprises porous catalyst particles comprising a supported metal catalyst structure.

11. The hydrogenation reactor system of any one of embodiments 1 to 11, further comprising a filter comprising a filter housing, a tube sheet defining an inlet compartment within the filter housing, and a plurality of filter elements associated with respective passages through the tube sheet.

12. The hydrogenation reactor system of embodiment 12, wherein the filter elements comprise a 2-50 micron fabric sock filter.

13. The hydrogenation reactor system of embodiment 12, or embodiment 13 further comprising magnets disposed in the filter elements.

14. The hydrogenation reactor system of any one of embodiments 12 to 14, further comprising a magnetic grate disposed in the inlet compartment of the filter housing to contact a liquid hydrocarbon flow and separate magnetically susceptible particles upstream from the filter elements.

15. The hydrogenation reactor system of embodiment 15, further comprising a flow path to introduce filtrate from the filter elements to an inlet surface of a foulant accumulation zone of the fixed catalyst bed.

16. The hydrogenation reactor system of embodiment 16, further comprising a bypass tube assembly comprising a plurality of tubes each comprising: an inlet opening at or above the inlet surface of the catalyst bed in fluid communication with the flow path to receive the filtrate, and fine openings through a cylinder wall to distribute the filtrate into the fixed catalyst bed below the inlet surface.

17. The hydrogenation reactor system of embodiment 17, wherein a total flow area through the fine openings of the cylinder walls that is at least half of a net area of the inlet surface of the foulant accumulation zone around the plurality of the tubes.

18. The hydrogenation reactor system of any one of embodiments 17 to 18, wherein the foulant accumulation zone of the fixed catalyst bed comprises a layer of inert particles adjacent the inlet surface.

19. The hydrogenation reactor system of any one of embodiments 17 to 19, wherein the total flow area through the fine openings of the cylinder walls is equal to or greater than the net area of the inlet surface of the foulant accumulation zone around the plurality of the tubes.

20. The hydrogenation reactor system of any one of embodiments 17 to 20, wherein each of the tubes in the bypass tube assembly has a length, below the inlet surface foulant accumulation zone of the fixed catalyst bed, that is from 1.5 to 3 times a hydraulic radius of the net area of the inlet surface of the foulant accumulation zone around the plurality of the tubes.

21. The hydrogenation reactor system of any one of embodiments 17 to 21, wherein a total cross section flow area of the bypass tube assembly within the tubes comprises from 8 to 20 percent of the net area of the inlet surface of the foulant accumulation zone around the plurality of the tubes.

22. The hydrogenation reactor system of any one of embodiments 17 to 22, wherein the bypass tube assembly comprises a center-to-center tube spacing of at least two tube diameters.

23. The hydrogenation reactor system of any one of embodiments 17 to 23, comprising a plurality of the reactor vessels and respective bypass tube assemblies wherein the reactor vessels are connected in series.

24. The hydrogenation system of any one of embodiments 17 to 24, wherein the bypass tube assembly comprises a framework to hold the tubes in fixed relative position with respect to each other.

25. The hydrogenation reactor system of embodiment 25, wherein the framework comprises a tube bundle comprising bracing between adjacent tubes and bracing extended radially outwardly from the tube bundle to a connecting ring.

26. The hydrogenation reactor system of any one of embodiments 17 to 26, wherein the bypass tube assembly is supported by the catalyst bed free of the reactor housing.

27. The hydrogenation reactor system of any one of embodiments 17 to 27, wherein the plurality of tubes comprise wedge wire tubes.

28. A method to hydrogenate a hydrocarbon, comprising contacting the fixed catalyst bed in the resin hydrogenation reactor system of any one of embodiments 1 to 28, with an unsaturated hydrocarbon under hydrogenation conditions to hydrogenate the unsaturated hydrocarbon.

29. A method to hydrogenate a hydrocarbon, comprising:
passing a liquid hydrocarbon feedstream through a magnetic field to separate magnetically susceptible particles from the hydrocarbon and form a magnetically lean stream;
introducing the magnetically lean stream into a fixed catalyst bed under hydrogenation conditions to saturate carbon-carbon double bonds in the hydrocarbon.

30. The method of embodiment 30, further comprising passing the magnetically lean stream through a filter upstream from the catalyst bed.

31. The method of embodiment 30 or embodiment 31, further comprising collecting the magnetically susceptible particles at a magnetic collection surface and periodically removing the collected particles.

32. The method of any one of embodiments 30 to 32, wherein the magnetic field is generated by a rare earth magnet.

33. The method of any one of embodiments 30 to 33, further comprising accumulating foulants in a zone adjacent an inlet surface of the catalyst bed.

34. The method of embodiment 34, further comprising:
introducing one portion of the magnetically lean stream to the inlet surface;
introducing another portion of the magnetically lean stream into the catalyst bed through a tube assembly to bypass the inlet surface, wherein the tube assembly comprises a plurality of tubes each comprising an inlet opening at or protruding above the inlet surface and fine openings through a cylinder wall extending into the catalyst bed below the inlet surface.

35. The method of embodiment 35, further comprising:
providing an initial total flow area through the fine openings of the cylinder walls that is at least half of a net area of the inlet surface of the foulant accumulation zone around the plurality of the tubes; and
recovering a hydrogenated effluent stream from the catalyst bed.

36. The method of embodiment 35 or 36, wherein the initial total flow area through the fine openings of the cylinder walls is equal to or greater than the net area of the inlet surface of the foulant accumulation zone around the plurality of the tubes.

37. The method of any one of embodiments 35 to 37, further comprising loading a layer of inert particles in the catalyst bed adjacent the inlet surface.

38. The method of any one of embodiments 35 to 38, wherein each of the tubes in the bypass tube assembly has a length, below the inlet surface foulant accumulation zone of the fixed catalyst bed, that is from 1.5 to 3 times a hydraulic radius of the net area of the inlet surface of the foulant accumulation zone around the plurality of the tubes, wherein a total cross sectional flow area of the bypass tube assembly within the tubes comprises from 8 to 20 percent of the net area of the inlet surface of the foulant accumulation zone around the plurality of the tubes, and wherein the bypass tube assembly comprises a center-to-center tube spacing of at least two tube diameters.

39. The method of any one of embodiments 30 to 39, comprising passing the fluid feedstream through a plurality of the catalyst beds in series, each catalyst bed comprising a said bypass tube assembly.

40. The method of claim any one of embodiments 30 to 40, comprising periodically replacing the catalyst bed when a pressure differential across the catalyst bed is from 4 to 15 times an initial pressure differential across the catalyst bed after loading the catalyst.

41. The method of any one of embodiments 30 to 41, comprising replacing the catalyst bed before reaching a maximum allowable pressure drop across the catalyst bed.

42. The method of any one of embodiments 30 to 48, comprising periodically replacing the catalyst bed before a pressure differential across the catalyst bed exceeds a physical crush strength of the catalyst.

43. The method of any one of embodiments 30 to 49, comprising periodically replacing the catalyst bed when a pressure differential across the catalyst bed is less than 50% of a physical crush strength of the catalyst.

44. The method of any one of embodiments 30 to 49, comprising periodically replacing the catalyst bed when a pressure differential across the catalyst bed is less than 30% of a physical crush strength of the catalyst.

45. The method of any one of embodiments 30 to 50, further comprising passing a monomer feedstream in series through a magnetic conditioning zone to remove magnetically susceptible particles and through a polymerization reactor to convert the monomer feedstream to the liquid hydrocarbon resin feedstream.

46. The hydrogenation reactor system or method of any one of embodiments 1 to 45, wherein the liquid hydrocarbon feedstream comprises a hydrocarbon resin.

47. A hydrogenation reactor system, comprising:
a reactor vessel housing a fixed catalyst bed;
an inlet flow path to introduce a fluid feed stream into the reactor housing in fluid communication with an upper surface of a foulant accumulation zone of the fixed catalyst bed;
a bypass conduit assembly comprising a plurality of conduits (e.g., tubes) each comprising: an inlet opening at or above the upper surface in fluid communication with the inlet flow path to receive the fluid, and fine openings through a wall (e.g., cylinder wall) to distribute the fluid into the fixed catalyst bed below the upper surface;
a total flow area through the fine openings of the walls that is at least half of a net area of the upper surface of the foulant accumulation zone around the plurality of the conduits; and
an outlet flow path from a lower end of the catalyst bed to withdraw reactor effluent.

48. The hydrogenation reactor system of embodiment 47, wherein the fluid feed stream comprises an unsaturated hydrocarbon and hydrogen, and wherein the catalyst bed comprises a metal oxide or metal sulfide hydrogenation catalyst.

49. The hydrogenation reactor system of any one of embodiments 47 to 48, wherein the foulant accumulation zone of the fixed catalyst bed comprises a layer of inert particles adjacent the upper surface.

50. The hydrogenation reactor system of any one of embodiments 47 to 49, wherein the total flow area through the fine openings of the walls is equal to or greater than the net area of the upper surface of the foulant accumulation zone around the plurality of the conduits.

51. The hydrogenation reactor system of any one of embodiments 47 to 50, wherein each of the conduits in the bypass conduit assembly has a length, below the upper surface foulant accumulation zone of the fixed catalyst bed, that is from 1.5 to 3 times a hydraulic radius of the net area of the upper surface of the foulant accumulation zone around the plurality of the conduits.

52. The hydrogenation reactor system of any one of embodiments 47 to 51, wherein a total cross section flow area of the bypass conduit assembly within the conduits comprises from 8 to 20% of the net area of the upper surface of the foulant accumulation zone around the plurality of the conduits.

53. The hydrogenation reactor system of any one of embodiments 47 to 52, wherein the bypass conduit assembly comprises a center-to-center conduit spacing of at least two tube widths (e.g., two tube diameters in the case of tubes).

54. The hydrogenation reactor system of any one of embodiments 47 to 53, comprising a plurality of the reactor vessels and respective bypass conduit assemblies wherein the reactor vessels are connected in series.

55. The hydrogenation reactor system of any one of embodiments 47 to 54, wherein the bypass conduit assembly comprises a framework to hold the conduits in fixed relative position with respect to each other.

56. The hydrogenation reactor system of embodiment 55, wherein the framework comprises a conduit bundle comprising bracing between adjacent conduits and bracing extended radially outwardly from the conduit bundle to a connecting ring.

57. The hydrogenation reactor system of any one of embodiments 47 to 56, wherein the bypass conduit assembly is supported by the catalyst bed free of the reactor housing.

58. The hydrogenation reactor system of any one of embodiments 47 to 57, wherein the plurality of conduits comprise wire mesh conduits (e.g., wire mesh tubes).

59. A method to hydrogenate a hydrocarbon, comprising contacting the fixed catalyst bed in the resin hydrogenation reactor system of any one of embodiments 47 to 58 with an unsaturated hydrocarbon under hydrogenation conditions to hydrogenate the unsaturated hydrocarbon.

60. A method to hydrogenate a hydrocarbon, comprising:
passing a fluid feed stream comprising an unsaturated hydrocarbon through a catalyst bed under hydrogenation conditions to hydrogenate the unsaturated hydrocarbon;
introducing one portion of the fluid feed stream to an upper surface of the catalyst bed to accumulate foulants in a zone adjacent the upper surface;
introducing another portion of the fluid feed stream into the catalyst bed through a conduit assembly to bypass the upper surface, wherein the conduit assembly comprises a plurality of conduits (e.g., tubes) each comprising an inlet opening at or above the upper surface and fine openings through a wall (e.g., cylinder wall) extending into the catalyst bed below the upper surface;
providing an initial total flow area through the fine openings of the walls that is at least half of a net area of the upper surface of the foulant accumulation zone around the plurality of the conduits; and
recovering a hydrogenated effluent stream from the catalyst bed.

61. The method of embodiment 60, further comprising loading a layer of inert particles in the catalyst bed adjacent the upper surface.

62. The method of any one of embodiments 60 to 61, wherein the initial total flow area through the fine openings of the walls is equal to or greater than the net area of the upper surface of the foulant accumulation zone around the plurality of the conduits.

63. The method of any one of embodiments 60 to 62, wherein each of the conduits in the bypass conduit assembly has a length, below the upper surface foulant accumulation zone of the fixed catalyst bed, that is from 1.5 to 3 times a hydraulic radius of the net area of the upper surface of the foulant accumulation zone around the plurality of the conduits, wherein a total cross section flow area of the bypass conduit assembly within the conduits comprises from 8 to 20% of the net area of the upper surface of the foulant accumulation zone around the plurality of the conduits, and wherein the bypass conduit assembly comprises a center-to-center conduit spacing of at least two conduit widths (e.g., tube diameters in the case of tubes).

64. The method of any one of embodiments 60 to 63, comprising passing the fluid feed stream through a plurality of the catalyst beds in series, each catalyst bed comprising a said bypass conduit assembly.

65. The method of any one of embodiments 60 to 64, comprising floating the bypass conduit assembly in the catalyst bed.

66. The method of any one of embodiments 60 to 65, comprising periodically replacing the catalyst bed when a pressure differential across the catalyst bed is from 4 to 15 times an initial pressure differential across the catalyst bed after loading the catalyst.

67. The method of any one of embodiments 60 to 64, comprising periodically replacing the catalyst bed before a pressure differential across the catalyst bed exceeds a physical crush strength of the catalyst.

EXAMPLES

Example 1

Catalyst without Scale Trap (Comparative)

A baseline was developed using a resin hydrogenation unit to hydrogenate resin for the purpose of color removal. Each reactor was loaded with catalyst supported by inert balls, then topped with inert balls. Upstream of the reactor was a pre-filter vessel containing filter media but no magnets. The catalyst utilization from a run with this configuration is used as the basis for comparing subsequent examples, which include all features of the baseline example plus additional hardware.

Example 2

Catalyst with Scale Trap (Comparative)

The lead reactor was fitted with a scale trap (i.e., a filter), placed at the top of the catalyst bed, the purpose of which was to capture fouling material. The scale trap that was used in the lead reactor consisted of seven wedge-wire tubes, 88.9 mm (3.5-in.) O.D×508 mm (20-in.) tall, arranged in a hexagonal pattern with one center tube. The pressure drop in the lead reactor was the limiting factor in catalyst run life. In three runs with this configuration, the catalyst utilization was 115% of that without a scale trap present.

Example 3

Catalyst with Bypass Tubes (Inventive)

There was no specific design basis for the scale trap that had previously been used. For the bypass tube assembly in this example, the basis for the new design included setting boundary limits of early catalyst life pressure drop being 138 kPa (20 psi) at the start of each run and 1030 kPa (150 psi) at the end. The bypass tube assembly was designed by calculating a reactor cross-sectional area when clean, an equivalent cross-sectional area when fouled and the resulting area lost due to fouling. This pressure drop model was validated using the original scale trap design and operating data from Example 2.

The calculated lost area due to fouling was then used as a basis to size the open area necessary in a wedge wire tube design which was at least as large as the area lost to fouling, in this example using a design factor of 2 to 2.5 to account for wedge wire fouling, plus the depth of the inert ball layer. In this design the bypass tube assembly consisted of 13×76.2 mm (3-in.) O.D. by 1067 mm (42-in.) long wedge wire tubes with a 4.77 mm (3/16-in.) wire height and 1.59 mm (1/16-in.) opening between wires, on a 2D triangular spacing. The resin hydrogenation unit was then operated using the same general procedure in two runs using the same catalyst, but with the new bypass tube assembly in place of the scale trap.

In two runs with this configuration, the catalyst utilization was 144% of that in Example 1.

Example 4

Application of Magnetics (Inventive)

Industrial magnets were placed in a reactor pre-filter vessel to investigate the effectiveness of permanent magnets for the removal of iron. Both ceramic and rare earth (Model P, Extreme Rare Earth from Eriez) were tested simply by placing one or more of the magnets in a pre-filter vessel and recovering the test magnets for inspection after a period of normal hydrogenation operations. The rare-earth magnets consistently collected more iron, so these were used in subsequent testing. Pressure drop data were obtained both before and after magnet installation, while holding other operating conditions generally uniform. In two runs with this configuration, the catalyst utilization was 160% of that in Example 1. In further contemplated runs with stronger magnets, more magnets, and/or more magnet/liquid contact, including additional magnets placed (1) in the pre-filter vessel for the polymerization reactor in the upstream process equipment, installed similarly as in the hydrogenation pre-filter as in FIGS. 5-6, and (2) in the pre-filter socks of the hydrogenation reactor as in FIG. 5A, it is expected that further improvement in the catalyst utilization may be achieved, potentially to the point that pressure buildup may ultimately not be the determining factor for a catalyst change.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A hydrogenation reactor system, comprising:
a magnetic conditioning zone to pass a liquid hydrocarbon feedstream through a magnetic field to separate magnetically susceptible particles from the hydrocarbon and form a magnetically lean stream;
an inlet flow path to introduce the magnetically lean stream from the magnetic conditioning zone into a fixed catalyst bed;
an outlet flow path from an outlet end of the catalyst bed to withdraw reactor effluent; and
a bypass tube assembly comprising a plurality of tubes, at least a portion of the tubes comprising: an inlet opening at or above an inlet surface of a foulant accumulation zone of the fixed catalyst bed to receive the magnetically lean stream, and a plurality of openings through a wall of at least one tube to distribute the magnetically lean stream into the fixed catalyst bed below the inlet surface.

2. The hydrogenation reactor system of claim 1, wherein the magnetic conditioning zone comprises a rare earth magnet.

3. The hydrogenation reactor system of claim 1, wherein the magnetic conditioning zone comprises a magnetic grate.

4. The hydrogenation reactor system of claim 1, further comprising filter media disposed in the inlet flow path between the magnetic conditioning zone and the fixed catalyst bed.

5. The hydrogenation reactor system of claim 4, wherein the filter media comprises a fabric sock filter.

6. The hydrogenation reactor system of claim 4, further comprising a magnet disposed in a sock of the fabric sock filter.

7. The hydrogenation reactor system of claim 1, wherein the liquid hydrocarbon feedstream comprises an unsaturated hydrocarbon resin, and wherein the catalyst bed comprises metal oxide or metal sulfide hydrogenation catalyst.

8. The hydrogenation reactor system of claim 7, further comprising a polymerization reactor to convert a monomer feedstream to the unsaturated hydrocarbon resin, and a second magnetic conditioning zone to remove magnetically susceptible particles from the monomer feedstream upstream of the polymerization reactor.

9. A method to hydrogenate a hydrocarbon, comprising contacting the fixed catalyst bed of claim 1 with an unsaturated hydrocarbon under hydrogenation conditions to hydrogenate the unsaturated hydrocarbon.

10. A method to hydrogenate a hydrocarbon, comprising:
passing a liquid hydrocarbon feedstream through a magnetic field to separate magnetically susceptible particles from the hydrocarbon and form a magnetically lean stream;
introducing the magnetically lean stream into a fixed catalyst bed under hydrogenation conditions to saturate at least a portion of the carbon-carbon double bonds in the hydrocarbon;
recovering a hydrogenated effluent stream from the catalyst bed;
accumulating foulants in a zone adjacent an inlet surface of the catalyst bed;
introducing a portion of the magnetically lean stream to the inlet surface; and
introducing another portion of the magnetically lean stream into the catalyst bed through a tube assembly to bypass the inlet surface, wherein the tube assembly comprises a plurality of tubes, at least a portion of the plurality of tubes comprising an inlet opening at or protruding above the inlet surface and a plurality of openings through one or more walls of at least one of the plurality of tubes opening into the catalyst bed below the inlet surface.

11. The method of claim 10, further comprising passing the magnetically lean stream through a filter upstream from the catalyst bed.

12. The method of claim 10, further comprising collecting the magnetically susceptible particles at a magnetic collection surface and periodically removing the collected particles.

13. The method of claim 10, wherein the magnetic field is generated by a rare earth magnet.

14. The method of claim 10, further comprising:
providing an initial total flow area through the plurality of openings of the one or more walls that is at least half of a net area of the inlet surface of the foulant accumulation zone around the plurality of the tubes.

15. The method of claim 10, wherein the initial total flow area through the plurality of openings of the one or more walls is equal to or greater than the net area of the inlet surface of the foulant accumulation zone around the plurality of the tubes.

16. The method of claim 10, further comprising loading a layer of inert particles in the catalyst bed adjacent the inlet surface.

17. The method of claim 10, wherein each of the tubes in the bypass tube assembly has a length, below the inlet surface foulant accumulation zone of the fixed catalyst bed, that is from 1.5 to 3 times a hydraulic radius of the net area of the inlet surface of the foulant accumulation zone around the plurality of the tubes, wherein a total cross sectional flow area of the bypass tube assembly within the tubes comprises from 8 to 20 percent of the net area of the inlet surface of the foulant accumulation zone around the plurality of the tubes, and wherein the bypass tube assembly comprises a center-to-center tube spacing of at least two tube diameters.

18. The method of claim 10, comprising passing the fluid feedstream through a plurality of the catalyst beds in series, each catalyst bed comprising a said bypass tube assembly.

19. The method of claim 10, comprising periodically replacing the catalyst bed when a pressure differential across the catalyst bed is from 4 to 15 times an initial pressure differential across the catalyst bed after loading the catalyst.

20. The method of claim 10, comprising replacing the catalyst bed before reaching a maximum allowable pressure drop across the catalyst bed.

21. The method of claim 10, further comprising passing a monomer feedstream in series through a magnetic conditioning zone to remove magnetically susceptible particles and through a polymerization reactor to convert the monomer feedstream to resin for the liquid hydrocarbon feedstream.

22. A hydrogenation reactor system, comprising:
a magnetic conditioning zone to pass a liquid hydrocarbon feedstream through a magnetic field to separate magnetically susceptible particles from the hydrocarbon and form a magnetically lean stream;
an inlet flow path to introduce the magnetically lean stream from the magnetic conditioning zone into a fixed catalyst bed; and
an outlet flow path from an outlet end of the catalyst bed to withdraw reactor effluent,
wherein the liquid hydrocarbon feedstream comprises an unsaturated hydrocarbon resin,
wherein the catalyst bed comprises metal oxide or metal sulfide hydrogenation catalyst,
and wherein the system further comprises a polymerization reactor to convert a monomer feedstream to the unsaturated hydrocarbon resin, and a second magnetic conditioning zone to remove magnetically susceptible particles from the monomer feedstream upstream of the polymerization reactor.

* * * * *